United States Patent Office 2,716,109
Patented Aug. 23, 1955

2,716,109

POLYMERIC 1-CHLORO-1,2-DIFLUOROETHYLENE

Robert P. Ruh and Marion R. Rector, Midland, Mich., assignors to The Dow Chemical Company, Midland, Mich., a corporation of Delaware No Drawing. Application October 4, 1951, Serial No. 249,802

2 Claims. (Cl. 260—92.1)

This invention relates to a new composition of matter, polymeric 1-chloro-1,2-difluoroethylene, and processes for preparing the same.

Polymers of fluorinated ethylenic compounds are known to have useful applications which depend on their inertness to oxidation, to the attack of acids and alkali metal hydroxides, to corrosive fumes and moisture, and to fire and thermal decomposition. However, in many cases, the usefulness of these polymers is limited due to their infusibility and insolubility. The known polymers of the class have also been difficult to prepare. Polymers of tetrafluoroethylene are so infusible that they cannot readily be thermally worked by operations such as molding and extrusion. Furthermore, the insolubility of these polymers in all common solvents greatly restricts their utilization in conventional coating methods. Monomeric tetrafluoroethylene and chlorotrifluoroethylene are relatively difficult to polymerize. Likewise monomeric 1,1-dichloro-2,2-difluoroethane and 1,2-dichloro-1,2-difluoroethane are known to be difficultly polymerizable. Prior to this invention, polymeric 1-chloro-1,2-difluoroethylene was unknown.

It is therefore an object of this invention to provide a method of polymerizing 1-chloro-1,2-difluoroethylene.

It is also an objective of this invention to provide a new composition of matter which is highly resistant to chemical attack, oxidation, fire, and thermal decomposition, but which may in addition be easily pressed, extruded, and molded into useful objects by virtue of its fusibility, and incorporated in protective coatings by virtue of its solubility in organic solvents and thinners.

Another object of the invention is to provide processes by which this new composition of matter may be readily obtained in high yields.

Further objects and advantages of the invention will be apparent from the following description.

The objects of the invention are accomplished, and a new and useful composition of matter is formed, by the polymerization of 1-chloro-1,2-difluoroethylene in the manner described below.

It has been discovered that the polymerization of 1-chloro-1,2-difluoroethylene will occur in mass, in liquid suspension and emulsion at ordinary temperatures and pressures, and that the addition of a polymerization catalyst increases the rate of polymerization.

Monomeric 1-chloro-1,2-difluoroethylene polymerized in the following examples was prepared by dechlorinating 1,1,2-trichloro-1,2-difluoroethane as in the following procedure. A solution of 474 grams of 1,1,2-trichloro-1,2-difluoroethane in 375 ml. of absolute ethanol was added dropwise to an excess of granulated zinc wetted with 75 ml. of absolute ethanol in a round-bottom flask. The flask was equipped with a reflux condenser connected with a cold trap immersed in a mixture of acetone and solid carbon dioxide. Fractionation of the product gave a 90 per cent yield of a cis-trans mixture of monomeric 1-chloro-1,2-difluoroethylene, CFCl=CFH with a freezing point of —152° C. and a boiling range of —16.0 to —14.5° C. at 744 mm.

*Example 1*

A non-emulsified aqueous suspension of the monomer was formed by first charging a 350 ml. glass pressure bottle with 200 ml. of water and 0.56 gram of a commercial paste of 50 per cent 2,4-dichlorobenzoyl peroxide polymerization catalyst in dibutylphthalate. The liquid was subjected to vacuum to withdraw any dissolved air. The charge was then frozen and cooled to the temperature of solid carbon dioxide. After the vacuum was released, 80 grams of cold liquid monomeric 1-chloro-1,2-difluoroethylene was added and the bottle sealed. Polymerization was carried out by tumbling the glass pressure bottle end-over-end in a water bath at a temperature of 35° C. After a period of 6 days a slightly flattened ball of clear resinous solid was removed from the pressure bottle, washed with water, and milled on compounding rolls to drive off moisture and monomer. The moisture-free polymer was broken into small pieces and compresed into films by flow molding with pressure at 180° C. These films were then dried in an oven at 60° C. Conversion of monomer to polymer approximated 95 weight per cent.

The following tests and observations were made on polymer films which were flow molded to the required thickness and aged a minimum of 24 hours before performing the test.

| | |
|---|---|
| Color of molded polymer "Feel." | Water clear and no color. Thin sections were flexible and extensible when fresh but stiffened on aging. |
| Absolute viscosity (A. S. T. M. description D-729-44T). | 1.019 cp. (2 percent solution in o-dichlorobenzene at 120° C.) |
| Tensile strength (Scott IP4) | 3,800 p. s. i. (22° C.) |
| Elongation at break Scott IP4) | Less than 5% (22° C.). |
| Stiffness (Tinius Olsen) | $1.49 \times 10^5$ p. s. i. (25° C.). |
| Durometer "C" hardness | 97. |
| Shore elasticity | 40. |
| Tear strength | 285 lbs./in. thickness (25° C.). |
| Crystallinity | Amorphous to X-rays. |
| Moisture vapor transmission | 0.2086 g./100 sq. in./24 hrs. for a film 1.4 mils in thickness. |
| Solubility | Appeared unaffected by water. Conc. sulfuric, nitric, hydrochloric and hydrofluoric acids were without effect at room temperature for 1 to 2 days. Sodium hydroxide had no discernible effect in any concentration at room temperature for $3\frac{1}{2}$ days. Acetone, methanol, ethyl acetate, acetonitrile, 1,4-dioxane, benzene, carbon tetrachloride, methylene chloride, and isophorone were solvents at 25° C. |
| Light-Stability (Fadeometer with two General Electric S-4 lamps). | 116 hours, slight yellowing; 456 hours, light yellow but remained clear. |
| Heat Stability | The polymer become soft at 150° C. but was without discoloration for as long as $5\frac{1}{2}$ hours. |

*Example 2*

In the non-emulsified aqueous suspension polymerization of 1-chloro-1,2-difluoroethylene, 24 ml. of a 1 per cent solution of methylcellulose was poured into a glass pressure bottle of 350 ml. capacity as a protective colloid. The methyl cellulose solution was diluted to 200 ml. with demineralized water and frozen as in Example 1. An 80 gram charge of CClF=CHF and 0.2 gram of $\alpha,\alpha'$-azodiisobutyronitrile catalyst was then added. After polymerizing at 30° C. in a water bath using end-over-end agitation for 20 days, discrete particles up to 0.5 mm. in diameter were recovered by filtration and dried. The recovered polymer is equivalent to an 88 per cent monomer conversion. An absolute viscosity of 1.026 centipoises was obtained for a 2 per cent solution of the polymer in o-dichlorobenzene at 120° C.

*Example 3*

A series of four monomer samples were polymerized using conditions identical to Example 2 except that no methylcellulose was employed to disperse the polymer.

In each case, a slightly flattened ball of polymer was obtained resembling the product of Example 1. The conversion to polymer averaged 96 per cent. The solution viscosity as determined in the preceding examples was approximately 1.27 centipoises.

*Example 4*

A 25 ml. ampoule was charged with a 13 ml. aqueous solution containing approximately 0.03 gram $K_2S_2O_8$ catalyst and 0.20 gram of the dihexylester of sodium sulfosuccinic acid as an emulsifying agent. The aqueous phase was subjected to a vacuum before freezing in solid carbon dioxide and approximately 6.5 grams of monomeric 1-chloro-1,2-difluoroethylene was sealed in the tared ampoule. After end-over-end agitation for 48 hours in a water bath at 40° C., the emulsion was coagulated by freezing. The washed and dried coagulum showed a conversion to the polymer of 89 per cent. Polymer films prepared by flow molding with pressure at 180° C. were clear and flexible. A 2 per cent solution of the polymer in o-dichlorobenzene had an absolute viscosity of 0.759 centipoise at 120° C.

*Example 5*

A mass polymerization was carried out in a 25 ml. ampoule using 10.0 grams of CFCl=CHF and 0.05 gram of $\alpha,\alpha'$-azodiisobutyronitrile catalyst. The polymer was examined after tumbling the ampoule end-over-end in a 35–45° C. water bath for 12 days. The conversion to polymer was equal to 95 per cent.

Although CFCl=CHF will polymerize at ordinary temperatures, the rate of polymerization at room temperature is slow. The polymerization rate increases with temperature and this factor may be used to produce higher yields in shorter times. The polymerization temperature depends in part on the catalyst employed; lower temperatures are advantageously used with more active catalysts. Temperatures from 0–200° C. or higher may be employed although the temperature range from 20–95° C. is satisfactory, with 30–50° C. preferred. Superatmospheric pressures, generated in all the foregoing examples, maintained the polymerizations in the liquid phase.

It is within th scope of the invention to employ liquids which are immiscible and inert with respect to 1-chloro-1,2-difluoroethylene as diluents in the polymerization process. Water is a particularly suitable diluent because it has a high specific heat and can readily dissipate the heat of reaction. Another function of the diluent is to act as a dispersing medium when the reactor is provided with a means for agitation. This in turn increases the tendency of the polymer to form into granular particles instead of large globules, and, when a dispersing agent is employed, leads to the production of highly homogeneous polymer which can readily be removed from the reactor. Suitable dispersing agents include methyl cellulose, starch, sodium alginate, polyvinyl alcohol, and other hydrophilic colloids. One may also employ emulsifiers, such as the dihexyl ester of sodium sulfosuccinic acid, sodium lauryl sulfate, and sodium hydroxy stearate, to obtain emulsions of the monomer in water.

The polymerization may be catalyzed by the addition of peroxy compounds, including hydrogen peroxide and its water soluble salts, such as sodium, potassium, calcium, and barium peroxide. The water soluble salts of true peracids such as perborates, percarbonates, perphosphates and persulfates may also be used. These inorganic peroxy compounds are particularly effective polymerization catalysts which are not readily retained in the polymer. Benzoyl peroxide and 2,4-dichlorobenzoyl peroxide are among the organic peroxides which catalyze the polymerization. Azo nitriles e. g. $\alpha,\alpha'$-azodiisobutyronitrile and $\alpha,\alpha'$-azobis($\alpha,\beta,\beta$ trimethylbutyronitrile) are preferred catalysts in that they can be decomposed by heating without leaving oxidizing residues. In general the concentration of catalyst varies from 0.1 to 1.0 per cent based on the weight of monomer, although lesser or greater amounts of catalyst may be employed.

The polymerization of 1-chloro-1,2-difluoroethylene may, in general, be carried out in batch or continuous process in any equipment which will contain the reactants at the pressure of the reaction. However, to avoid acquisition of metallic contaminants, corrosion resistant equipment is desirable.

Like the polymers of tetrafluoroethylene and chlorotrifluoroethylene polymeric 1-chloro-1,2-difluoroethylene is inert to oxidation, to the attack of acids and alkali metal hydroxides, to corrosive fumes and moisture, and to fire and thermal decomposition. However, polymeric 1-chloro-1,2-difluoroethylene is soluble in solvents such as acetone, methanol, ethyl acetate, acetonitrile, 1,4-dioxane, carbon tetrachloride, methylene chloride, benzene, and isophorone. This polymer is also readily fusible and gives water-clear, colorless moldings which have good light and heat stability. Its solubility in common organic solvents combined with its comparatively low melting point and high resistance to chemical attack and fire, can be advantageously utilized in many applications. Materials and equipment which are subject to the corrosive action of moisture and chemicals may be protected with coatings of the polymer, applied in conventional manner employing volatile solvents or by spraying finely-divided particles through a flame. Many kinds of objects may be pressed, molded, or extruded from polymeric 1-chloro-1,2-difluoroethylene.

We claim:

1. As a new synthetic resin, a solid polymer of 1-chloro-1,2-difluoroethylene, being readily fusible and soluble in common organic solvents, and being substantially inert to oxidation, thermal decomposition, and to attack by acids, alkali metal hydroxides, and moisture.

2. A substantially non-crystalline film of the resin according to claim 1.

References Cited in the file of this patent

UNITED STATES PATENTS

| | | |
|---|---|---|
| 2,362,094 | Renoll | Nov. 7, 1944 |
| 2,497,046 | Kropa | Feb. 7, 1950 |

FOREIGN PATENTS

| | | |
|---|---|---|
| 465,520 | Great Britain | May 3, 1937 |
| 1,056,573 | France | Oct. 21, 1953 |